United States Patent
Jeon

(10) Patent No.: US 11,895,178 B2
(45) Date of Patent: Feb. 6, 2024

(54) METHOD AND DEVICE FOR PROVIDING OBFUSCATED ADVERTISEMENT BY COUTERACTING ON ADVERTISEMENT BLOCKING FUNCTION

(71) Applicant: Adshield, Inc., Seoul (KR)

(72) Inventor: Sang Hyeon Jeon, Seoul (KR)

(73) Assignee: Adshield, Inc., Seoul (KR)

( * ) Notice: Subject to any disclaimer, the term of this patent is extended or adjusted under 35 U.S.C. 154(b) by 0 days.

(21) Appl. No.: 17/702,311

(22) Filed: Mar. 23, 2022

(65) Prior Publication Data

US 2023/0262106 A1   Aug. 17, 2023

(30) Foreign Application Priority Data

Feb. 14, 2022  (KR) .......... 10-2022-0018831
Feb. 14, 2022  (KR) .......... 10-2022-0018834

(51) Int. Cl.
  *H04L 67/02*  (2022.01)
  *G06Q 30/0241* (2023.01)
  *H04L 9/40*  (2022.01)

(52) U.S. Cl.
  CPC ......... *H04L 67/02* (2013.01); *G06Q 30/0241* (2013.01); *G06Q 30/0277* (2013.01); *H04L 63/0245* (2013.01); *H04L 63/0428* (2013.01)

(58) Field of Classification Search
  None
  See application file for complete search history.

(56) References Cited

U.S. PATENT DOCUMENTS

| | | | |
|---|---|---|---|
| 9,027,142 B1* | 5/2015 | Call ............... | H04L 63/1416 726/25 |
| 9,177,335 B1 | 11/2015 | Carasso | |
| 9,679,315 B2* | 6/2017 | Carasso ............ | H04L 67/02 |
| 11,178,120 B2* | 11/2021 | Lyndon-James .... | H04L 63/0428 |
| 2010/0332993 A1 | 12/2010 | Bousseton .......... | G06Q 30/02 715/738 |
| 2016/0253718 A1* | 9/2016 | Carasso ............ | H04L 63/029 705/14.73 |
| 2017/0237823 A1* | 8/2017 | Pyper ............... | H04L 51/212 709/201 |
| 2017/0345063 A1* | 11/2017 | Bauman ............. | H04L 67/56 |
| 2017/0345064 A1* | 11/2017 | Bauman ............. | G06Q 30/0277 |
| 2018/0189824 A1* | 7/2018 | Yanamadala ....... | H04L 67/34 |
| 2020/0250282 A1* | 8/2020 | Chida .............. | G06F 21/6218 |
| 2021/0034719 A1* | 2/2021 | Brown .............. | G06F 21/14 |
| 2021/0250335 A1* | 8/2021 | Lyndon-James .... | H04L 63/0236 |
| 2021/0334342 A1* | 10/2021 | Hernvall ........... | H04L 9/50 |

\* cited by examiner

*Primary Examiner* — Lashonda Jacobs-Burton
(74) *Attorney, Agent, or Firm* — ASLAN LAW, P.C.

(57) ABSTRACT

An operating method of a server to provide an advertisement, which includes: receiving HTTP request from a client; acquiring HTTP response to the HTTP request, which includes first advertisement information; amending the HTTP response—including obfuscating at least a partial field of the HTTP response including the first advertisement information; and transferring the amended HTTP response to the client.

14 Claims, 15 Drawing Sheets

FIG. 12

```
|Network|Element|Console|Lighthouse|Source|Performance|>>>  △9  🗏34  ✱ ⋮ ✕

21/12/03/bbs/i8299930830.jpg') no-repeat top center;"class="bg-min-width">
▶ <div class="commu-wrap">flex
  ▶ <xxxxxxxxx=xxxx"xxx">
    ▶ <xxxx>flex
      ▶ <xxxx="xxxxxx">...<x/xx>
        <xxxxxxxx"xxx"xxxx=xxx.xxx(xxx.xxx.xxx:">
        <xxxxxxxxx"xxx"xxxx=xxx.xxx(xxx.xxx.xxx:">
        <iframe id="comAdTopBanner" name="comAdTopBanner" width="728"
        height="90" frameborder="0" marginwidth="0" marginheight="0"
        topmargin="0" scrolling="no" src="https://zicf.inven.co.kr/Real
        Media/ads/adstream sx.ads/inven/overwatch@x62?ipos-comAdTopBanner
        &ibt=ad-header"> ad  == $0
        ▶ #document
        </iframe>
    </div>
⋮
```

10

20

Gaming original model launching!!

OOO Mobile  OOdata on OO month  Coming soon

| Information | Strategy | Freeboard | Postscript | Customer service |
|---|---|---|---|---|

HOT Collection of strategies!!
recommend Postscript after referring to collection of strategies

FIG. 14

| Header | Payload | Preview | Response | Start point | Timing | Cookie |
|---|---|---|---|---|---|---|

▶ General

Request URL: https://www.thisisjustad.com/servlet/adBanner?from=&s=553577&igb=160_600&cntad=1&cnesr=1

Request method : GET

Status code : ● 200

Remote address : 119.205.238.29:443

Referrer policy : strict-origin-when-cross-origin

FIG. 15

| Header | Payload | Preview | Response | Start point | Timing | Cookie |
|---|---|---|---|---|---|---|
| ▶ General | | | | | | |

Request URL : https://www.itswhatureq.com/HU0jZvDULsQssMY_rdblqzhMMMsf.class
Request method : POST
Status code : ● 200 OK
Remote address : 15,68,55,76:443
Referrer policy : strict-origin-when-cross-origin

METHOD AND DEVICE FOR PROVIDING OBFUSCATED ADVERTISEMENT BY COUTERACTING ON ADVERTISEMENT BLOCKING FUNCTION

CROSS-REFERENCE TO RELATED APPLICATIONS

This application claims priority to KR Patent Application No. 10-2022-0018831 filed on Feb. 14, 2022, and this application claims priority to KR Patent Application No. 10-2022-0018834 filed on Feb. 14, 2022, the entire contents of which are hereby incorporated by reference.

TECHNICAL FIELD

The present invention relates to a method and device for providing advertisement, and more specifically, a method for providing obfuscated advertisement in response of advertisement blocking function and a device for implementing above method.

BACKGROUND ART

On-line advertisement is one of important profit sources to contents publishers. Further, on-line advertisement is also one of means for promoting information on diverse products and services.

The on-line advertisement may be output in any form of banner, pop-up, embedded, in-line type, full-page advertisements, and a whole page form, when a user visits the page or leaves the same. The on-line advertisement may be provided in the form of link, audio contents or text, image and/or graphic contents including other multi-media contents.

An advertisement blocker blocks on-line advertisements in websites such as HyperText Markup Language (HTML) page and other download-possible contents. The advertisement blocker may be the service operating through software applicable programs, browser components, extension programs, additional functions, script, or the like.

Such an advertisement blocker as described above deprives advertising earnings invested to a content publisher and prevents marketing or promotion of products and service and provision of information. Accordingly, it is required to countervail influence of the advertisement blocker, thereby displaying a content containing the advertisement to clients.

DISCLOSURE

Technical Problem

In order to solve the above-described problem, an object of the present invention is to provide a method, device and system for providing advertisement to clients even if an advertisement blocker acts on the clients.

Another object of the present invention to solve the above-described problem is to provide a method, device and system for providing advertisement to clients by making a detour around the advertisement blocker when the advertisement blocker acts on the clients.

Technical Solution

In order to achieve the above objects, an operating method of a server to provide an advertisement may include: receiving HTTP request from a client; acquiring HTTP response to the HTTP request, which includes first advertisement information ("first AD information"); amending the HTTP response—including a step of obfuscating at least a partial field of the HTTP response including the first AD information —; and transferring the amended HTTP response to the client.

In this regard, the step of obfuscating the at least partial field of the HTTP response may further include adding a plurality of hierarchical tags and attribute values to the at least partial field of the HTTP response, wherein the plurality of hierarchical tags and attribute values may be randomly given to each HTTP request.

At this time, the plurality of hierarchical tags and attribute values may be each hierarchical tag and attribute value independent of an operation to output the first advertisement information executed by the client.

At this time, if information on at least a partial field of the amended HTTP response is blocked, the amended HTTP response may further include a repair script for utilizing the above blocked partial field.

In this regard, the repair script may include at least one instruction executed by a processor of the client, and the at least one instruction of the repair script may be executed to determine whether the first AD information was blocked or not by the client.

At this time, if the first AD information is blocked, the at least one instruction of the repair script may further be executed to transmit information requesting second advertisement information ("second AD information") to the server by the client.

In this regard, the operating method may include: receiving a request for advertisement from the client; requesting the second AD information to an outside server; acquiring the second AD information from the outside server; and transmitting the second ADt information to the client.

With regard to a computer recording medium including at least one instruction executed by a processer to accomplish the above object, the at least one instruction may be executed by a processor, in order to: receive HTTP request from a client; acquire HTTP response as a response information to the HTTP request; amend the HTTP response; and transfer the amended HTTP response to the client. Further, in order to amend the HTTP response, the instruction may be executed to obfuscate at least a partial field of the HTTP response, which includes the first advertisement information, by the processor.

In this regard, with regard to obfuscation of the at least partial field of the HTTP response, the at least one instruction may further be executed to add a plurality of hierarchical tags and attribute values to the at least partial field of the HTTP response by the processor, wherein the plurality of hierarchical tags and attribute values may be randomly provided to each HTTP request.

At this time, the plurality of hierarchical tags and attribute values may be each hierarchical tag and attribute value independent of an operation to output the first AD information executed by the client.

Herein, if information on the at least partial field of the amended HTTP response is blocked, the amended HTTP response may further include a repair script to utilize the blocked partial field.

Herein, the repair script may include at least one instruction executed by a processor of the client, wherein the at least one instruction of the repair script may be executed by the processor of the client in order to determine whether the first advertisement information was blocked or not.

Herein, the at least one instruction of the repair script may further be executed to request second AD information to the server by the processor of the client when the first AD information is blocked.

Herein, the at least one instruction may be executed to: receive a request for advertisement from the client; request the second AD information to an outside server; acquire the second AD information from the outside server; and transmit the second AD information to the client by the processor.

With regard to the operating method of the client to provide an advertisement in order to accomplish the above objects, this method may include: transmitting HTTP request to a server; acquiring HTTP response as a response information to the HTTP request, which includes first AD information, from the server; and outputting the HTTP response, wherein the HTTP response information is HTTP response information amended by the server, in which at least a partial field including the first AD information is obfuscated.

At this time, the at least partial field of the HTTP response may include a plurality of hierarchical tags and attribute values randomly added to each HTTP request.

Herein, the plurality of hierarchical tags and attribute values may be each hierarchical tag and attribute value independent of an operation to output the first AD information.

In this regard, if information on at least a partial field of the amended HTTP response information is blocked, the amended HTTP response information may further include a repair script to utilize the above blocked partial field.

Herein, executing the repair script may be performed to determine whether the first AD information was blocked or not.

In this regard, when the first AD information is blocked, the operating method may further include: transmitting AD request information to the server; acquiring the second AD information from the server; and outputting the second AD information.

Advantageous Effects

According to the advertisement providing method of the present invention, even when an advertisement blocker is operated on a client, an advertisement may be provided to the client.

DESCRIPTION OF DRAWINGS

FIG. 12 illustrates an embodiment of HTTP response including a field in relation to general advertisement information.

FIG. 14 illustrates one embodiment of general advertisement request.

FIG. 15 illustrates one embodiment of the encrypted AD request in the AD providing system.

DETAILED DESCRIPTION OF PREFERRED EMBODIMENTS OF INVENTION

Figure 1:
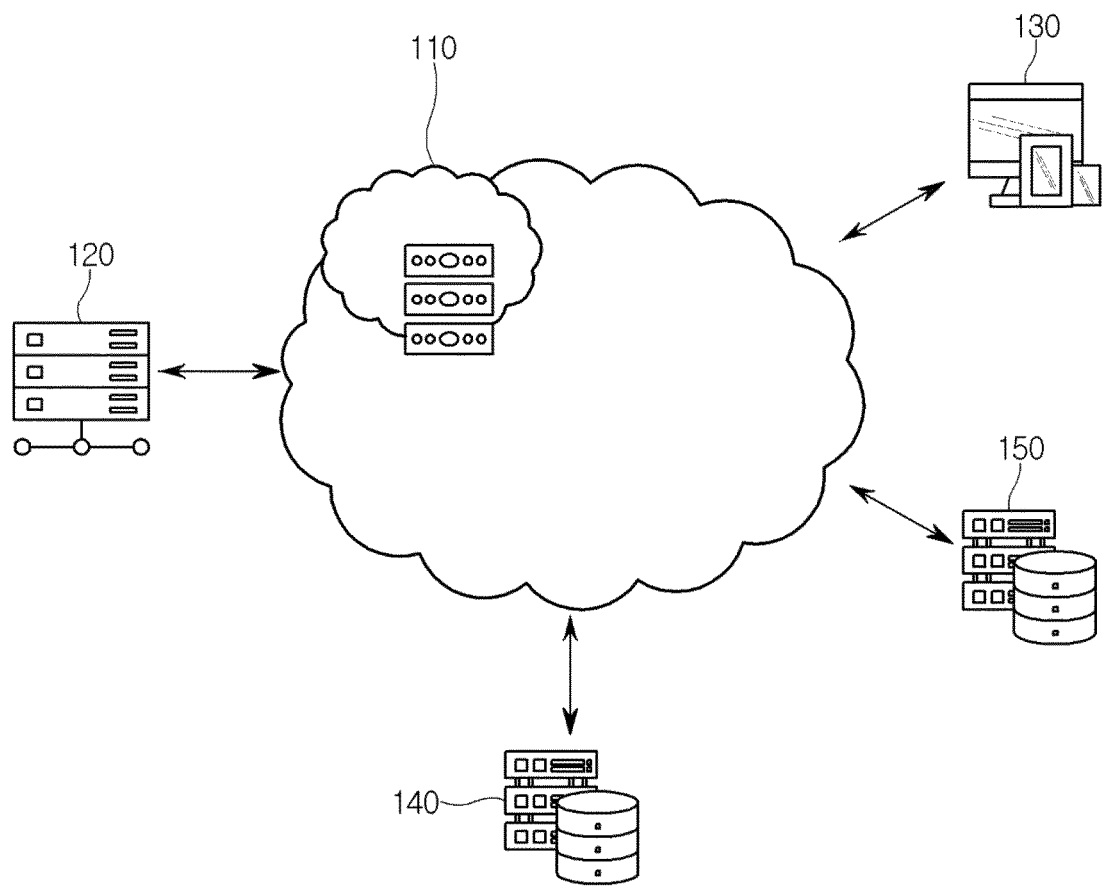
FIG. 1 is a diagram illustrating an embodiment of the configuration of an advertisement ("AD") providing system.

The present invention may include addition of various alterations, as well as various embodiments. Hereinafter, specific embodiments of the present invention will be illustrated in the accompanying drawing and described as follows. However, it should be understood that this invention is not intended to be limited to the specific embodiments described herein but includes all of various modifications, equivalents and/or alternatives included in the spirit and technical scope of the present invention.

The expressions such as "first", "second", etc. may describe different components but does not limit these components. These terms are used only to distinguish a component from another component. For example, a first component may also be referred to as a second component, likewise, the second component may also represent the first component without departing the scope of rights of the present invention. Further, the term of "and/or" may include a combination of plural items described in relation to one another or any one of the plural items described in relation to one another.

When any component is described to "be connected to" or "coupled with/to" another component, it should be understood that the former component may be directly connected to or coupled with/to the latter component or another different component may be present therebetween. On the other hand, if it is mentioned that a component is "directly connected to" or "directly coupled with/to" another component, it should be understood that no other component exists between the above two components.

The expressions in the present application are used only for describing particular embodiments but not intended to restrict the present invention. The singular expression may include plural expression unless the context clearly dictates otherwise. In the present application, terms such as "include", "have", etc. should be understood to be used to denote the presence of features, numerals, steps, operations, components, parts described in the specification or a combination thereof, however, not to exclude the presence of one or more other features, numerals, steps, operations, components, parts or a combination thereof or possibility of addition thereof.

Unless defined otherwise herein, all expressions used herein, including technical or scientific terms, may have the same meanings as commonly understood by those skilled in the art. The terms defined in typically use dictionaries should be interpreted with the same or similar sense as the contextual meanings of the related art and, unless clearly defined in the present specification, may not be interpreted as ideally or excessively formal meanings.

Hereinafter, preferred embodiments of the present invention will be described in more detail with reference to the accompanying drawings. In order to expedite overall understanding in the following description of the present invention, the same reference numerals are assigned to the same components in the drawings and redundant descriptions thereof will be omitted.

FIG. 1 illustrates an embodiment of the configuration of an advertisement providing system.

Referring to FIG. 1, the advertisement ("AD") providing system may include a content delivery network (CDN) 100, one or more proxies 120, one or more clients 130, one or more web servers 140, and one or more AD servers 150. Separate components of the AD providing system may be connected through internet to execute communication.

CDN 110 may be a data center connected to a network comprising distributed nodes and/or a network comprising nodes. CDN 110 may utilize an internet service provider, a carrier, etc. which hosts the node, server and data center. The content provider may transfer contents or the like to the client 130 by utilizing components of the system including CDN 110.

The proxy 120 may be a network accessible device which is operable independent of the CDN 110, the client 130, the server, etc. According to one embodiment, the proxy 120 may be associated with the web server 140 to execute network access operation. The proxy may be forward proxy or reverse proxy.

The client 130 may be a device having a processor to execute applications for content processing, rendering or displaying. For example, the client 130 may be at least one among laptop computers, smartphones, tablet PCs and desktop computer machines. The most general application for content processing, rendering or displaying is a web browsing application but may also include other applications.

The web server 140 may be a server for hosting and transferring contents. The content may refer to any website, text, document, file, media, application, service or game, which are encoded with digitals and can be transferred through a network. The content may be displayed to the client 130 along with information on advertisement provided by one or more AD servers 150.

The AD server 150 may be a server that hosts and transfers various ADs built in the content of a content publisher. In the case of calling an advertisement when the client 130 receives and processes the content, the AD server 150 may provide AD information capable of being provided to the client 130. The advertisement may be configured in the content, or rendered or displayed in a defined manner.

The devices of the AD providing system may be configured as described later.

Figure 2:
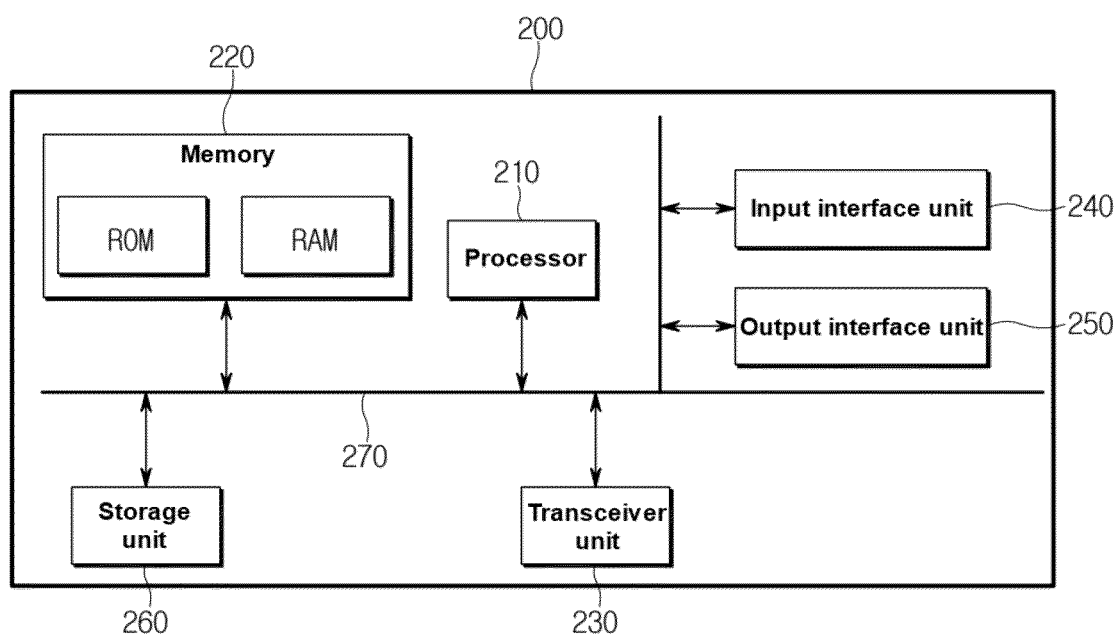
FIG. 2 is an exemplary diagram illustrating a hardware configuration of a device included in the AD providing system shown in FIG. 1.

FIG. 2 is an exemplary diagram illustrating the hardware construction of the device in the AD providing system as shown in FIG. 1.

Referring to FIG. 2, the device 200 may include at least one processor 210, and a memory 220 for storing instructions indicating that the at least one processor 210 executes at least one step.

In this regard, the at least one processor 210 may refer to a central processing unit (CPU), a graphics processing unit (GPU), or an exclusive processor that executes the methods described in the embodiments of the present invention. The memory 220 and a storage unit 260, respectively, may consist of at least one among a volatile storage medium and a non-volatile storage medium. For example, the memory 220 may consist of at least one among a read only memory (ROM) and a random access memory (RAM).

Further, the device 200 may include a transceiver 230 to execute communication through a wireless network. Further, the device 200 may further include an input interface unit 240, an output interface unit 250, a storage unit 260, or the like. Separate components included in the device 200 may be connected to one another through buses 270 to execute communication therebetween.

Signal flow exchanged between the devices of the AD providing system may be performed as described later.

Figure 3:
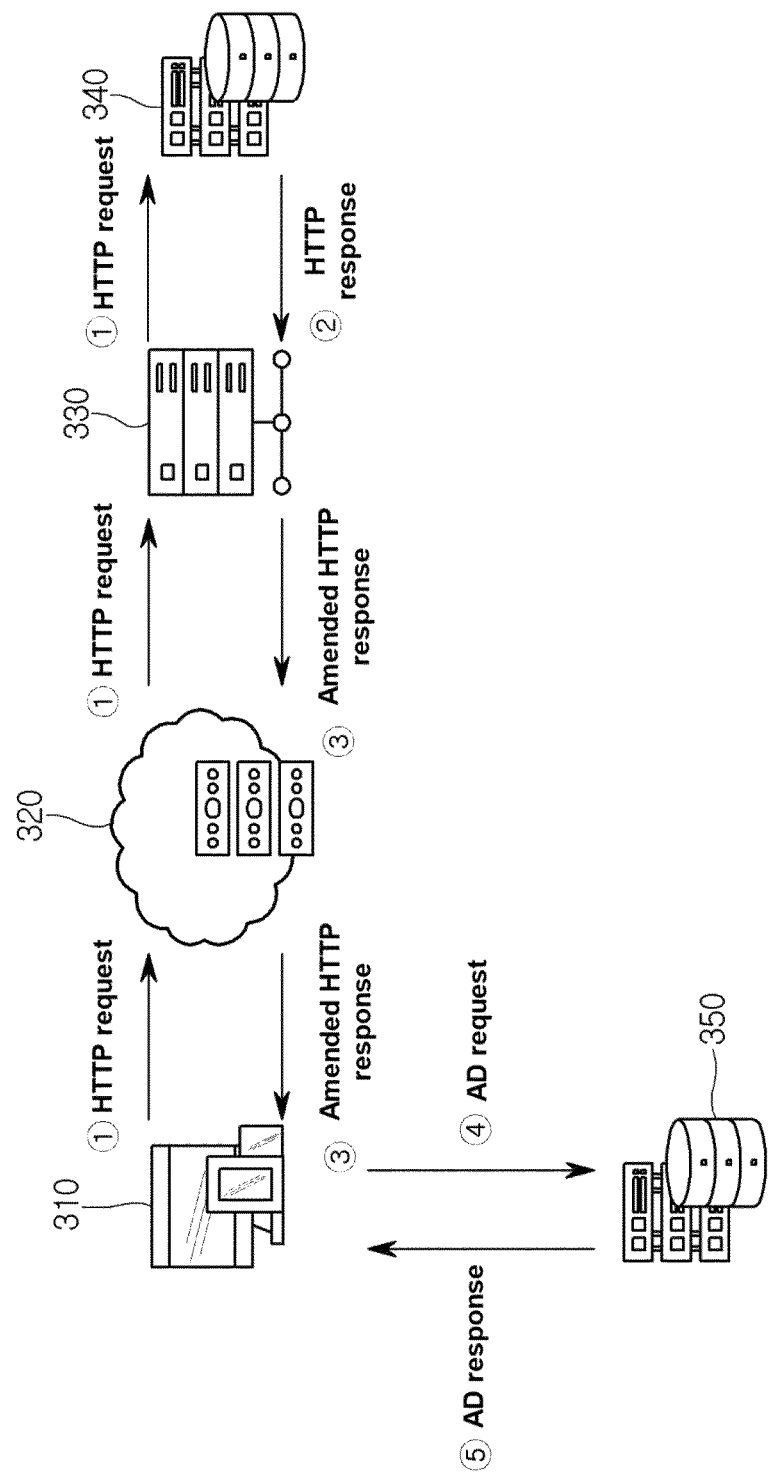
FIG. 3 is a conceptual diagram illustrating signal flow between separate components of the AD providing system.
Figure 4:
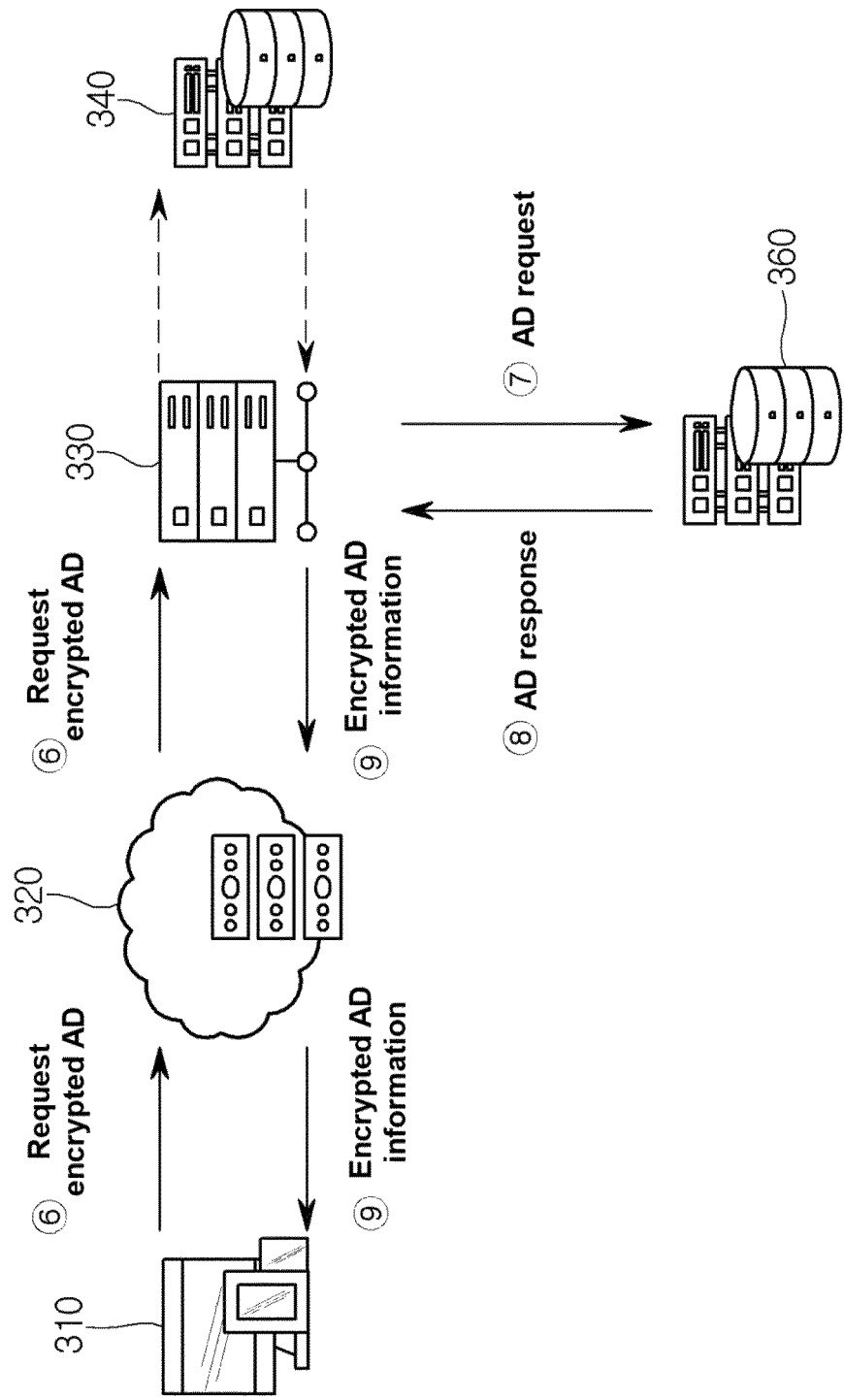
FIG. 4 is a conceptual diagram illustrating signal flow between separate components of the AD providing system.

FIGS. 3 and 4 are conceptual diagrams illustrating signal flow between separate components in the AD providing system.

Referring to FIGS. 3 and 4, the AD providing system may include a client 310, CDN 320, a proxy 330, a web server 340 and an AD server 350. Herein, some components of the AD providing system may be omitted.

Referring to FIG. 3, the client 310 in (1) may request HTTP content to the web server 340. The HTTP content request may be executed by calling a specific link or starting any application for loading the content. HTTP content request may be generally transmitted in the form of HTTP GET request along with URL that identifies an address of the web server 340 and the content. HTTP content request may be forwarded to the web server 340 through CDN 320 and/or the proxy 330.

In (2), the web server 340 may transmit HTTP response corresponding to the HTTP content request to the proxy 330. Herein, the HTTP response (or HTTP status) may include HTTP content and AD information for calling advertisement. The Ad information may include an address of the AD server 350 and HTML attribute for designating the advertisement.

The proxy 330 may amend at least a part of the HTTP response received from the web server 340. For example, the proxy 330 may amend content, AD information, etc. included in the HTTP response. According to one embodiment, the proxy 330 may execute operations such as encryption and/or obfuscation of the content and/or AD information.

In accordance with one embodiment of the present invention, the proxy 330 may create a plurality of hierarchical tags and an attribute value of the tags, respectively, and add the same to a field including the AD information in the HTTP response, thereby enabling obfuscation of at least a partial field of the HTTP response.

Alternatively, the proxy 330 may add an instruction such as script to the HTTP response. Further, in (3), the proxy 330 may transmit the amended HTTP response to the client 310. The amended HTTP response may be forwarded to the client 310 through CDN 320, otherwise, may be directly transmitted without passing through CDN 320.

The client 310 requesting HTTP content may receive HTTP response including the HTTP content from the proxy 330 and/or CDN 320. AD blocking function performed by the client 310 may block AD calling based on AD information included in the HTTP response.

According to one embodiment, the AD blocker may block rendering of AD field and/or AD information using CSS rule. However, the field including AD information in the amended HTTP response is obfuscated, therefore, the AD blocker may not specify the field including AD information in the HTTP response. Therefore, the AD blocker may not block the AD field using an algorithm such as CSS rule. That is, at least a partial field obfuscated in the HTTP response may avoid the AD blocker.

In (4), if AD blocking function of the client 310 does not work, the client 310 may request advertisement to the AD server 350 based on AD information included in the HTTP response. Herein, 'does not work' includes all cases that the AD blocker program cannot affect display of the AD information. For example, first case is that the AD block program is executed but cannot detect the AD information so that the AD can be shown on the client's display. Another case is that the AD block program is never executed.

In (5), the client 310 may receive AD response from the AD server 350, and may output advertisement based on the received AD response. Accordingly, the client 310 may successfully call the advertisement.

When the AD information included in HTTP response is blocked by executing the AD blocking function despite the obfuscation, the separate components of the AD providing system may exchange additional signals as described later.

Referring to FIG. 4, the client 310 in (6) may request an additional advertisement to the proxy server 330. The additional AD request may include an address of the AD server 360 that provides the additional AD, and HTML attribute or the like in order to designate the additional AD. According to one embodiment, the client 310 may encrypt the additional AD request to avoid AD call blocking, and then may transmit the encrypted additional AD request to the proxy 330. The additional AD request may be forwarded to the proxy 330 through CDN 320.

In (7), the proxy 330 may request AD information to the AD server 360 corresponding to the received AD request. In (8), the proxy 330 may receive the AD information from the AD server 360. In this regard, the AD server shown in FIG. 4 may be a server managed by an operating owner of the AD providing service according to the present disclosure, and may be a separate server as distinct from the AD server 350 of FIG. 3. Hereinafter, the AD server 360 shown in FIG. 4 may be named a "self-AD server 360".

Further, in (9), the proxy 330 may transmit AD information received from the self-AD server 360 to the client 310. At this time, the AD information may be encrypted by the proxy 330 and then transmitted to the client 310.

In (9), the client 310 may receive additional AD information from the proxy 330 and/or the CDN 320. Further, the client 310 may output the received advertisement. Herein, if the AD information is encrypted, the client 310 may decode the received advertisement and then output the same.

That is, referring to FIG. 4, the client 310 may exchange AD request and AD response with the self-AD server 360, therefore, the client needs not to exchange any alternative signal with the web server 340 in order to acquire additional advertisement.

The amended HTTP response may include at least obfuscated AD information or obfuscated field including the AD information. Alternatively, the amended HTTP response may include at least a repair script. The HTTP response may be amended to comprise the obfuscated AD information and/or the repair script.

The operation of devices in the AD providing system owing to signal flow exchanged between the devices may be performed as described later.

Figure 5:
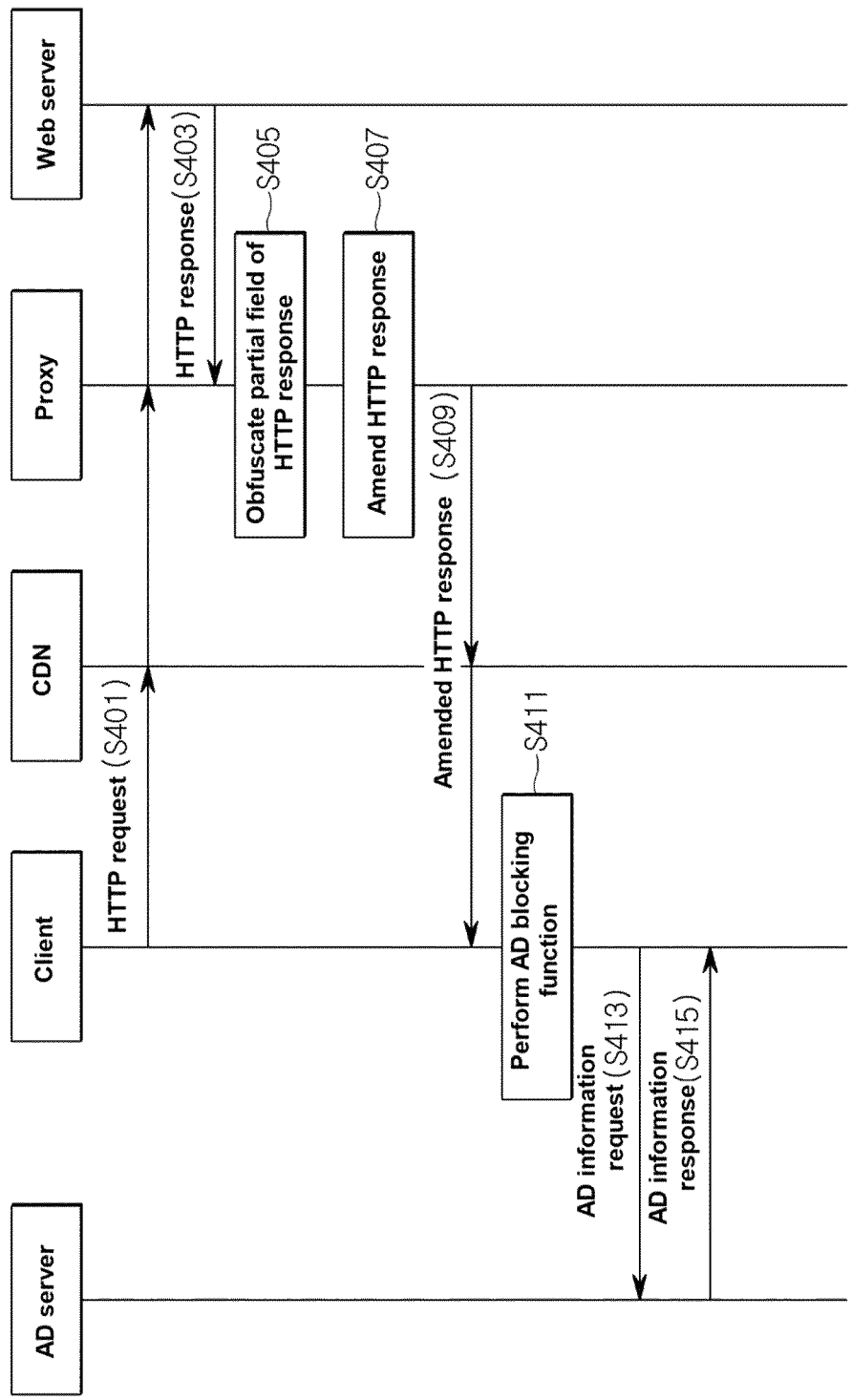
FIG. 5 is a flowchart illustrating the operations of separate components of the AD providing system.

FIG. 5 is a flowchart illustrating the operations of separate components of the AD providing system.

Referring to FIG. 5, the AD providing system may include a client, CDN, a proxy, a web server and an AD server. However, some components of the AD providing system may be omitted.

In step S401, the client may transmit HTTP request to the web server. At this time, the HTTP request may be forwarded to the web server through CDN and/or the proxy.

In step S403, the web server may transmit HTTP response corresponding to the HTTP request to the proxy.

In step S405, the proxy may obfuscate at least a partial field of the HTTP response. Herein, the at least partial field of the HTTP response may be a field including AD information. Further, at least the obfuscated partial field may further include tags and attribute values regardless of AD information call.

In step S407, the proxy may amend the HTTP response. For example, the proxy may obfuscate at least a partial field of the HTTP response to thus amend the HTTP response. Alternatively, the proxy may add a repair script to the HTTP response.

In step S409, the proxy may transmit the amended HTTP response to the client. Herein, the amended HTTP response may be forwarded to the client through CDN.

In step S411, the client may perform AD blocking function. Due to the obfuscated partial field of the obfuscated HTTP response, the AD blocker may not specify a field including AD information in the HTTP response. As a result, the obfuscated partial field of the HTTP response may avoid the AD blocker.

When the AD information included in the HTTP response is not blocked by the AD blocking function of the client, in step S413, the client may request AD information included in the HTTP response.

In step S415, the client may receive a response to the AD information request from the AD server. Accordingly, the client may execute rendering the AD information acquired from the AD server.

Specific operations of the proxy of the AD providing system may be performed as follows.

Figure 6:
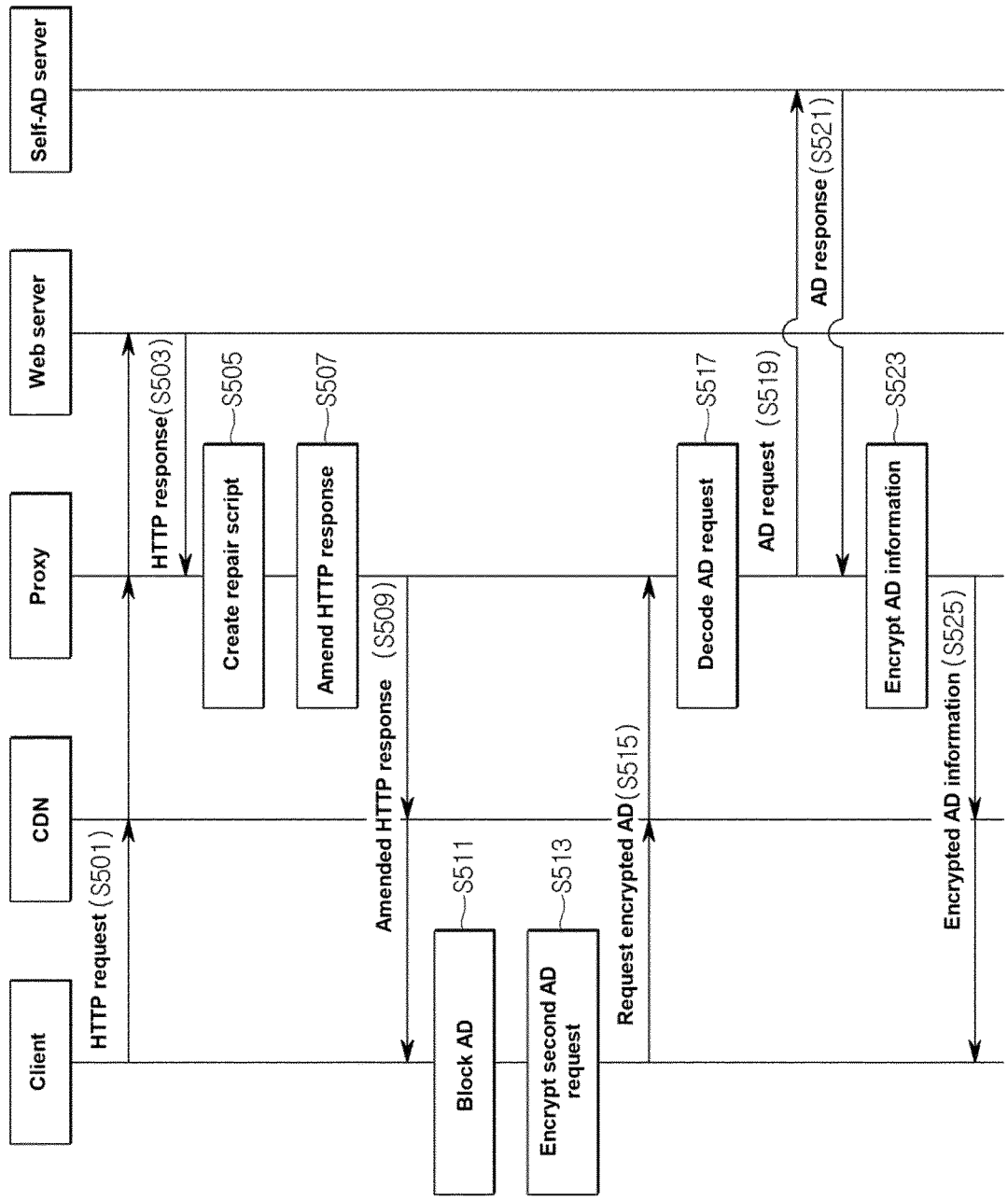
FIG. 6 is a flowchart illustrating the operations of the separate components of the AD providing system.

FIG. 6 is a flowchart illustrating the operations of separate components of the AD providing system.

Referring to FIG. 6, the AD providing system may include a client, CDN, a proxy, a web server and an AD server. However, some components of the AD providing system may be omitted.

In step S501, the client may transmit HTTP request to the web server. At this time, the HTTP request may be forwarded to the web server through CDN and/or the proxy.

In step S503, the web server may transmit HTTP response corresponding to the HTTP request to the proxy.

In step S505, the proxy may generate a repair script for utilizing at least a partial field of the HTTP response. Herein, the proxy may obfuscate at least a partial field of the HTTP response. Herein, the at least partial field of the HTTP response may be a field including AD information. Further, at least the obfuscated partial field may further include tags and attribute values regardless of AD information call.

In step S507, the proxy may amend the HTTP response. For example, the proxy may add a repair script to the HTTP response. Alternatively, the proxy may obfuscate at least a partial field of the HTTP response to thus amend the HTTP response.

In step S509, the proxy may transmit the amended HTTP response to the client. Herein, the amended HTTP response may be forwarded to the client through CDN.

In step S511, the client may perform AD blocking function. If the at least partial field of the HTTP response is obfuscated, due to the obfuscated partial field of the obfuscated HTTP response, the AD blocker may not specify a field including AD information in the HTTP response. As a result, the obfuscated partial field of the HTTP response may avoid the AD blocker.

When the AD information included in the HTTP response is not blocked by the AD blocking function of the client, the client may request and output AD information included in the HTTP response.

On the other hand, when an advertisement included in HTTP response is blocked by the AD blocking function of the client, the client may execute at least an instruction included in a repair script of the amended HTTP response.

In step S513, the client may create an AD request in order to request alternative advertisement, and then, may encrypt the created AD request.

In step S515, the client may transmit the encrypted AD request to the proxy. Herein, the encrypted AD request may be forwarded to the proxy through CDN.

In step S517, the proxy may decode the encrypted AD request received from the client.

In step S519, the proxy may request an advertisement to a self-AD server corresponding to the decoded AD request.

In step S521, an outside AD server may transmit AD information corresponding to the AD request to the proxy. The AD information transmitted by the self-AD server may be an advertisement content itself. That is, the self-AD server may be a subject to be displayed on the client, such as images, texts, audio contents, etc. of the AD content.

In step S523, the proxy may encrypt the AD information acquired from the outside server.

In step S525, the proxy may transmit the encrypted AD information to the client. Herein, the encrypted AD information may be forwarded to the client through CDN.

As a result, the client may receive the encrypted AD information. The amended HTTP response and/or repair script may include a field indicated to display encrypted AD contents. The client may execute at least an instruction of the repair script so as to decode the encrypted AD information.

Therefore, the client may output the decoded AD information.

FIG. 5 relates to the obfuscation and FIG. 6 is about the repair script. However, the two cases are compatible. In other words, the obfuscation step S405 and the repair script generation step S505 can be conducted in one embodiment and added to the HTTP response when the amendment step S407 or S507 is conducted.

Figure 7:
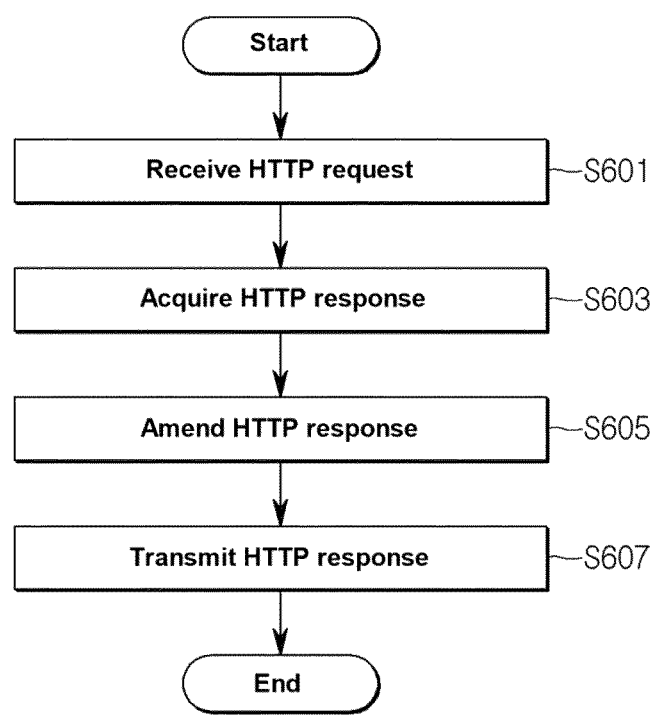
FIG. 7 is a flow diagram illustrating an operation of proxy of the AD providing system.

FIG. 7 is a flow diagram illustrating operation of the proxy of the AD providing system.

In step S601, the proxy may receive HTTP request from the client.

In step S603, the proxy may request a content corresponding to the HTTP request to an outside server, and may acquire HTTP response corresponding to the HTTP request from the outside server. At this time, the HTTP response may include first AD information. The first AD information may include information and/or script for calling the first AD. For example, the information for calling the first AD may be an address such as URL, URI, etc. in order to call advertisement to an AD server.

In step S605, the proxy may amend the HTTP response received from the outside server. Specifically, the proxy may insert at least a script and/or instruction to avoid the AD blocker of the client into the HTTP response. The operation of the proxy to amend HTTP response may be performed as described later.

Figure 8:
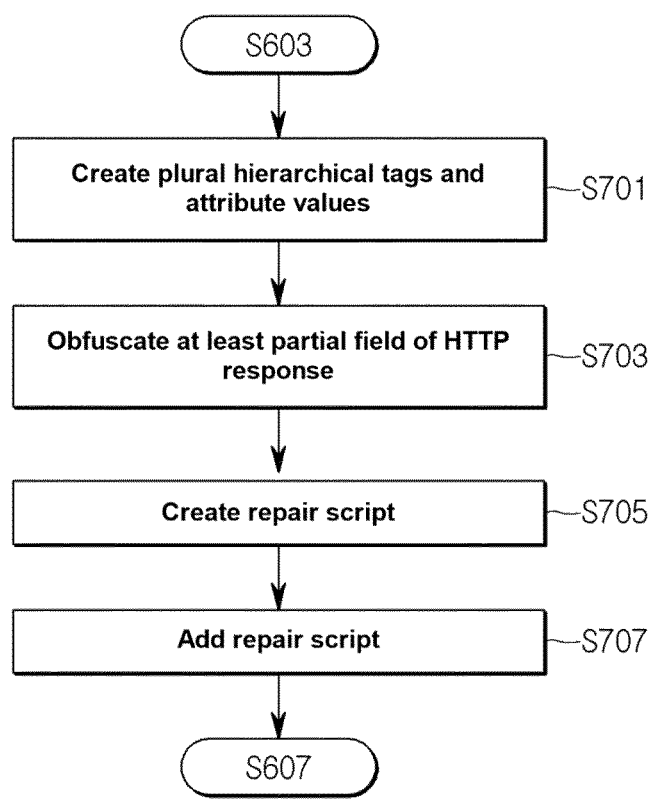
FIG. 8 is a flow diagram illustrating HTTP response amending operation of proxy of the AD providing system.

FIG. 8 is a flow diagram illustrating operation of amending HTTP response of the proxy of the AD providing system.

In step S701, the proxy may create a plurality of hierarchical tags and attribute values of the tags, respectively. At this time, the plurality of hierarchical tags and attribute values may be hierarchical tags and attribute values independent of output of the HTTP response. Furthermore, the plurality of hierarchical tags and attribute values may be randomly created for each HTTP request. A hierarchical tag independent of output of the HTTP response including AD information may be named dummy tag.

In step S703, the proxy may add the dummy tag to the HTTP response so as to obfuscate at least a partial field of the HTTP response. At this time, the at least partial field may be a field including a script in relation to the first AD information included in the HTTP response that was received from the outside server. Further, the at least partial field may include at least an instruction and/or script for calling second AD from a self-advertisement server.

In other words, the proxy may add the generated dummy tag to the HTTP response so as to obfuscate a field including a script in relation to the first AD information and/or an instruction or the like for calling the second AD. At this time, the dummy tag may be information independent of an operation to output the first AD information executed by the client. Herein, at least a partial field may be named an advertisement calling field including a dummy tag, information on first AD and/or second AD, etc.

In step S705, the proxy may create a repair script for utilizing the at least partial field of the HTTP response. The repair script may include at least an instruction for utilizing the at least partial field of the HTTP response. In this regard, the at least partial field may be a field including a script in relation to the first AD information included in the HTTP response that was received from the outside server, or the like. At least an instruction of the repair script may be executed by the client.

The repair script may include an instruction executed to determine whether AD blocking function is performed by the client. Further, when the calling of the first AD included in the HTTP response is blocked by the client, the repair script may include an instruction which is executed to conduct encryption of information for requesting alternative advertisement, and then transmit the encrypted AD requesting information. In order to determine whether AD blocking function is performed or not, a method of adding a field including often blocked AD information to the amended HTTP response may be utilized. As such, providing blocking-possible clues through known functions of the AD blocker may be sufficient in order to determine whether to perform AD blocking function or not.

In step S707, the proxy may add the repair script to the HTTP response. Therefore, the HTTP response amended by the proxy may include dummy tags for obfuscating at least a partial field including a script in relation to the first AD information or the like, as well as the repair script for utilizing the at least partial field. However, the amended HTTP response may not include the dummy tag and/or repair script, and it is obviously understood that additional construction to ensure utility of at least a partial field may further be included.

Again referring to FIG. 7, in step S607, the proxy may transmit the amended HTTP response. According to one embodiment, the amended HTTP response may include a field in relation to the obfuscated first AD information. According to another embodiment, the amended HTTP response may include a repair script for utilizing at least a partial field such as the field in relation to the first AD information.

The client may receive the amended HTTP response from the proxy. The operation of the client having received the amended HTTP response may be performed as described later.

Figure 9:
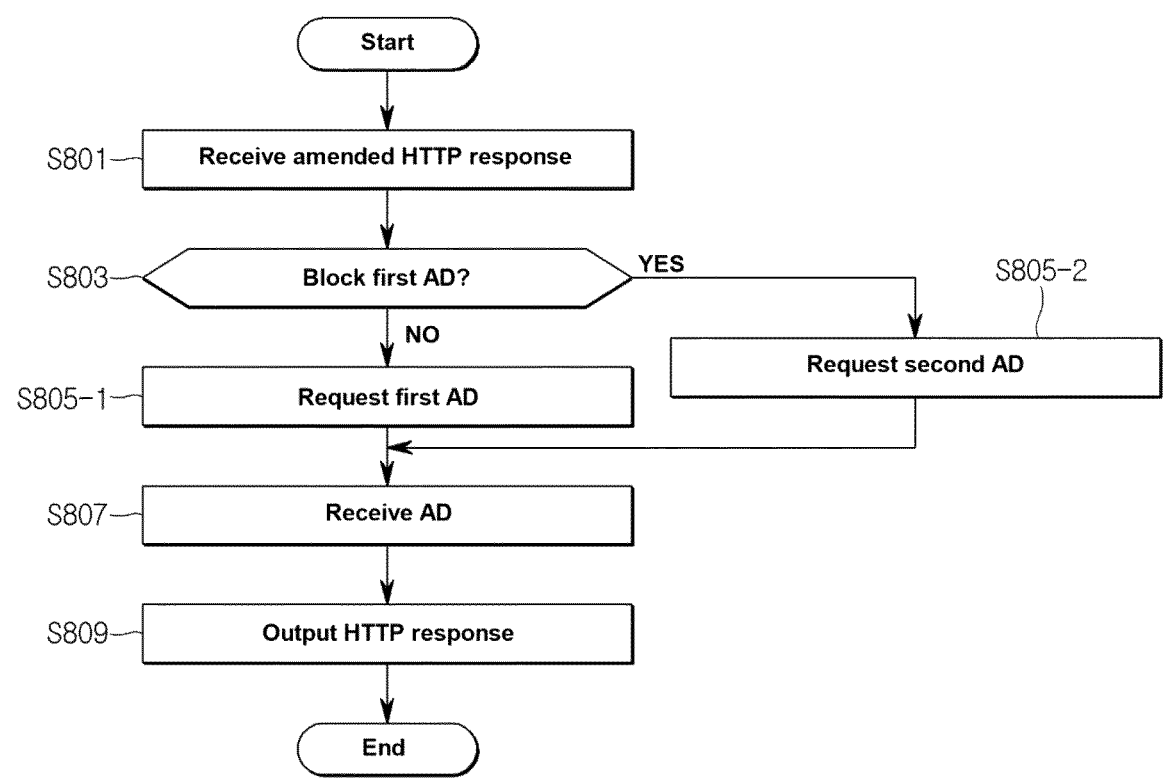
FIG. 9 is a flow diagram illustrating an operation of the client in the AD providing system when receiving the amended HTTP response.

FIG. 9 is a flow diagram illustrating the operation of the client of the AD providing system that received the amended HTTP response.

In step S801, the client may receive the amended HTTP response from the proxy.

The AD blocker of the client having received the amended HTTP response may perform AD blocking function. However, if the field of the amended HTTP response is obfuscated, the AD blocker of the client may not specify an advertisement field in the HTTP response. Therefore, the AD blocker may not block the advertisement of the HTTP response.

In step S803, because of performing the AD blocking function, the client may determine whether the first AD information included in the amended HTTP response was blocked or not.

If the first AD information included in the amended HTTP response is not blocked, in step S805-1, the client may transmit a request for the first advertisement ("first AD request") based on information on the first AD request to the AD server.

Meanwhile, when the first AD information included in the amended HTTP response is blocked, in step S805-2, the client may execute at least an instruction of the repair script. In other words, the client may replace the first AD information included in the amended HTTP response and, in order to utilize a partial field of the HTTP response in relation to AD information, may execute at least an instruction of the repair script. The operation of the client that execute the at least one instruction of the repair script is performed as described later.

Figure 10:
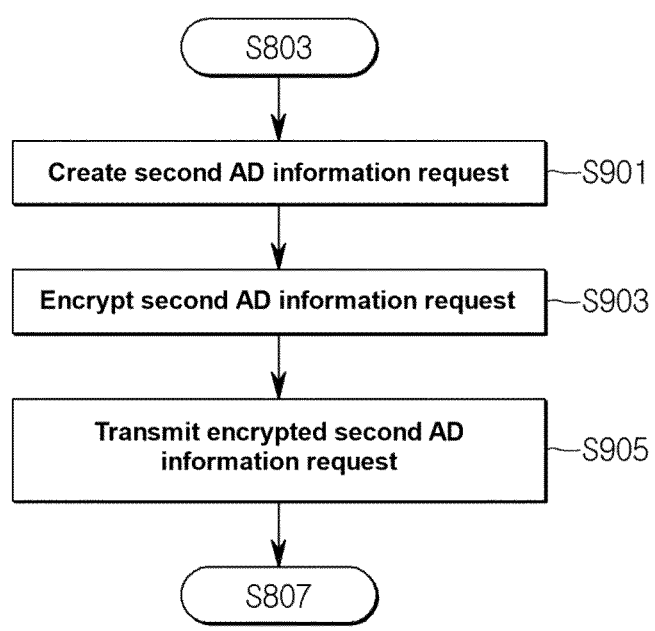
FIG. 10 is a flow diagram illustrating an operation of executing a repair script of the client in the AD providing system.

FIG. 10 is a flow diagram illustrating the operation of executing the repair script of the client in the AD providing system.

In step S901, the client having blocked first AD information may create a request for second AD information ("second AD information request"). At this time, the second AD information may be an alternative advertisement independent of the first AD information. Further, an AD server to manage the second AD may be a self-AD server managed by an operating owner of AD providing service and may be an alternative server independent of the AD server managing the first AD.

In step S903, the client may encrypt the second AD information request created by the client. The client may encrypt a second AD request so as to amend at least one information among a domain of the AD request, a request method and a request address. For example, the client may amend the domain of the second AD request into a domain of the server that transmitted the HTTP response. Therefore, the domain of the second AD request may be the same as the domain of the server that transmitted the HTTP response.

In step S905, the client may transmit the encrypted second AD information request to the proxy. When the client performing AD blocking function requests AD information to an outside AD server, the AD information request may be blocked by the AD blocking function of the client. On the other hand, the encrypted AD request may avoid the AD blocking function of the client. As a result, the encrypted AD request may be transmitted to the outside server such as the proxy.

Referring FIG. 9 again, in step S807, the client may receive AD information corresponding to AD request from the AD server. When the client did not block the first AD information included in the amended HTTP response, the client may receive a first advertisement from the AD server. When the client blocked the first AD information included in the amended HTTP response, the client may receive a second advertisement provided by the self-AD server from the proxy.

In this regard, the second AD received from the proxy may be encrypted information. The client having received the encrypted second AD may execute at least an instruction of the repair script, thereby decoding the second AD.

In step S809, the client may output the received advertisement. Therefore, the client may output the first or second AD regardless of performing AD blocking function.

Figure 11:
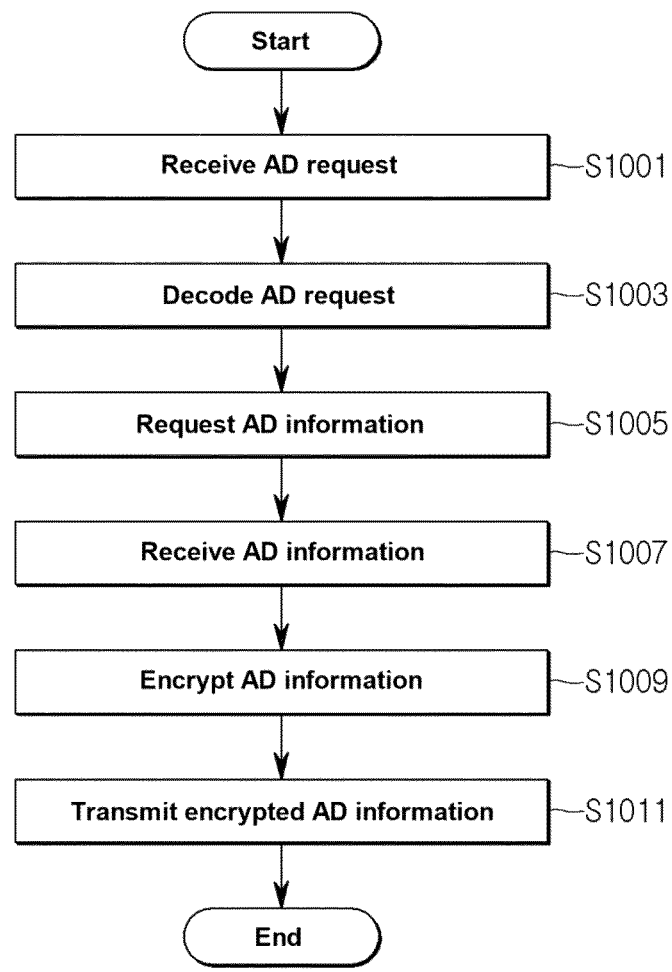
FIG. 11 is a flow diagram illustrating an operation of proxy of the AD providing system when receiving a request for encrypted advertisement.

FIG. 11 is a flow diagram illustrating the operation of the proxy of the AD providing system that received the encrypted AD request.

In step S1001, the proxy may receive AD request from the client. In this regard, the AD request may be AD request encrypted by the client. The encrypted AD information may be transmitted in the form of HTTP request, wherein a request method of the HTTP request may be POST.

In step S1003, the proxy may decode the encrypted AD request.

In step S1005, the proxy may request AD information corresponding to the decoded AD request to an outside server. The outside server may be a self-AD server connected to the proxy through a network such as internet.

In step S1007, the proxy may acquire the AD information from the outside server. At this time, the AD information acquired from the outside server may be information in the form of HTTP contents.

In step S1009, the proxy may encrypt the AD information acquired from the outside server.

In step S1011, the proxy may transmit the encrypted AD information to the client. The encrypted AD information may be transmitted in the form of HTTP response, wherein a request method of the HTTP response may be POST. Further, the encrypted AD information may be transmitted in the form of data included in a body of the HTTP response.

With regard to the encrypted AD request which is exchanged in the way of AD providing method according to the present invention, embodiments may be described as follows.

With regard to HTTP response including a field in relation to general AD information, as well as the HTTP response including obfuscated field in relation to AD information, embodiments may be described as follows.

FIG. 12 illustrates one embodiment of HTTP response including a field in relation to general advertisement information, and FIG. 15 illustrates one embodiment of HTTP response including obfuscated field in relation to AD information in the AD providing system.

Figure 13:
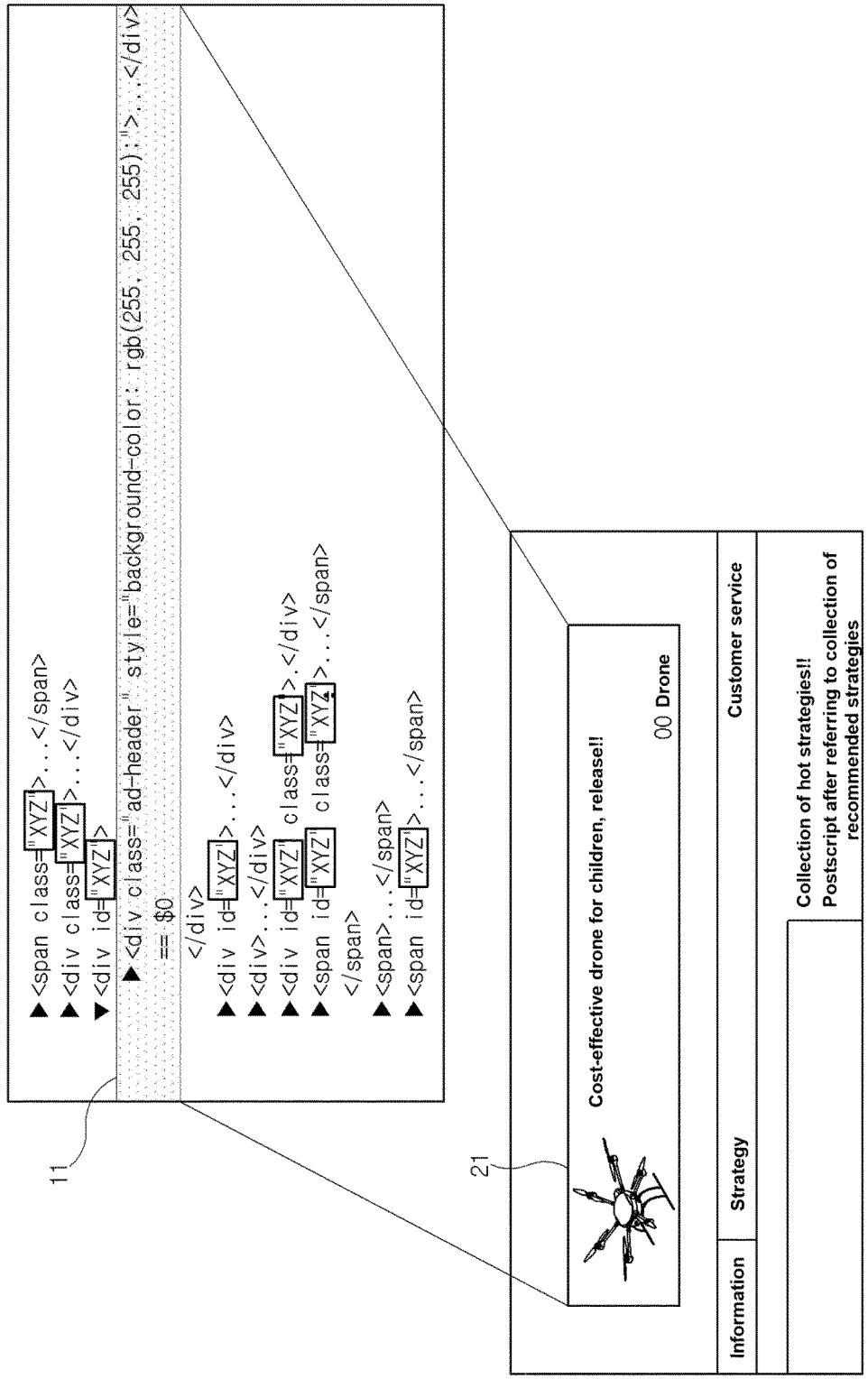
FIG. 13 illustrates an embodiment of HTTP response including obfuscated field in relation to advertisement information in the advertisement providing system.

Referring to FIGS. 12 and 13, the HTTP response may include information on fields for rendering at least one content. In this case, some of the fields for rendering the contents may be each field for rendering AD information. Further, information on the fields for rendering contents may include at least a tag for specifying the field, an attribute value of the tag, and information for calling the contents.

Referring to FIG. 12, the field in relation to the general AD information in the HTTP response may include super tags having specific attribute values, an attribute value of a field for outputting AD information, and information such as an address required for calling the AD information.

Specifically, the field including AD information in the HTTP response may be specified by at least one among style information, script information, id and attribute information of iframe, and class information of division and section of the field for outputting AD information.

On the other hand, referring to FIG. 13, the obfuscated field in relation to the AD information of the HTTP response may further include a plurality of tags, and attribute values provided to the tags, respectively. At this time, some of the plurality of tags may be added as sub-hierarchical. Further, the plurality of tags may be overlapped.

Further, the attribute value provided to each tag may not indicate any specific information. That is, the attribute value provided to each tag may be any value independent of the attribute for outputting AD information.

In this regard, at least one among type, arrangement and structure of the plurality of tags may be differently determined for every HTTP requests. Further, the attribute value provided to each tag may be differently determined for every HTTP requests.

FIG. 14 illustrates one embodiment of general advertisement request, and FIG. illustrates one embodiment of the encrypted AD request in the AD providing system.

Referring to FIGS. 14 and 15, the AD request may include information of request URLs, request methods, state codes, remote address and referrer policy. The request URL may indicate address to request advertisement, etc. The request method may indicate purpose and type of the request which is transferred by the client. The remote address may indicate address of remote proxy. The referrer policy may indicate policy of referrer remaining when visiting a web site through a hyperlink.

Referring to FIG. 14, the request URL of a general advertisement request may be an address and/or URL of an advertisement server that provides advertisement information. In addition, the request method may be GET, which is a method capable of requesting resources and/or data on the external server side in the form of a URL.

On the other hand, referring to FIG. 15, in the case of an encrypted advertisement request, the domain of the request URL may be an address and/or URL of a web server requesting HTTP content. In addition, the request method may be POST, which is a method capable of requesting resources and/or data from an external server in the form of media or the like, not in the form of a URL.

The methods according to the present invention may be embodied in the form of a program instruction performed through a variety of computer means and then be recorded on a computer-readable medium. The computer-readable medium may include program instruction, data file, data structure, etc. alone or in combination thereof. The program instruction recorded on the computer-readable medium may be specially designed and configured, or may be any one known to those skilled in software application and useable thereby.

Examples of the computer-readable medium may include hardware units particularly configured to store and execute the program instruction, such as ROM, RAM, flash memory, etc. Examples of the program instruction may not only include a machine language code that is prepared by a compiler but also a high level language code that can be implemented by a computer using interpreter or the like. The above hardware unit may be configured to be operated as at least one software module in order to execute the operation of the present invention, or vice versa.

As such, the present invention has been described with reference to the embodiments, however, it could be understood that those skilled in the art to which the present invention pertains can variously alter and modify the present invention within a range not departing from the spirit and scope of the present invention described in the following claims.

The invention claimed is:

1. An operating method of a server to provide an advertisement, comprising:
  receiving a Hypertext Transfer Protocol (HTTP) request from a client;
  acquiring HTTP response to the HTTP request from a web server, which includes first advertisement information ("first AD information");
  amending the HTTP response—including a step of obfuscating at least a partial field of the HTTP response including the first AD information; and
  transferring the amended HTTP response to the client,
  wherein the step of obfuscating the at least partial field of the HTTP response includes adding a dummy tag to the at least partial field of the HTTP response to obfuscate the at least partial field of the HTTP response, the dummy tag including a plurality of hierarchical tags and attribute values,
  wherein the plurality of hierarchical tags and attribute values are randomly assigned for every individual HTTP request, and
  wherein the plurality of hierarchical tags and attribute values are independent of an operation to output the first AD information, which is executed by the client.

2. The method according to claim 1, wherein, if information on at least a partial field of the amended HTTP response is blocked,
  the amended HTTP response further includes a repair script to utilize the blocked partial field.

3. The method according to claim 2, wherein the repair script includes at least one instruction executed by a processor of the client, and
  wherein the at least one instruction of the repair script is executed to determine whether the first AD information was blocked or not by the client.

4. The method according to claim 3, wherein, if the first AD information is blocked,
  the at least one instruction of the repair script is further executed to transmit information requesting second advertisement information ("second AD information") to the server by the client.

5. The method according to claim 4, further comprising:
  receiving a request for advertisement from the client;
  requesting the second AD information to an outside server;
  acquiring the second AD information from the outside server; and
  transmitting the second AD information to the client.

6. A non-transitory computer readable medium including at least one instruction executed by a processor,
  wherein the at least one instruction is executed by the processor of a server in order to:
  receive a Hypertext Transfer Protocol (HTTP) request from a client;
  acquire HTTP response as a response information to the HTTP request from a web server;
  amend the HTTP response; and
  transfer the amended HTTP response to the client, wherein, in order to amend the HTTP response, the instruction is executed to obfuscate at least a partial field of the HTTP response including first AD information by the processor, wherein, in order to obfuscate at least a partial field of the HTTP response, the at least one instruction is furthered execute to:

add a dummy tag to the at least partial field of the HTPP response by the processor to obfuscate the at least partial field of the HTTP response, the dummy tag including a plurality of hierarchical tags and attribute values, wherein the plurality of hierarchical tags and attribute values are randomly assigned for every HTTP request, and wherein the plurality of hierarchical tags and attribute values are independent of an operation to output the first AD information executed by the client.

7. The non-transitory computer readable medium according to claim 6, wherein, if information on at least a partial field of the amended HTTP response is blocked, the amended HTTP response further includes a repair script to utilize the blocked partial field.

8. The non-transitory computer readable medium according to claim 7, wherein the repair script includes at least one instruction executed by the processor of the client, wherein the at least one instruction of the repair script is executed by the processor of the client in order to determine whether the first AD information was blocked or not.

9. The non-transitory computer readable medium according to claim 8, wherein, if the first AD information is blocked, the at least one instruction of the repair script is further executed by the processor of the client in order to request second AD information to the server.

10. The non-transitory computer readable medium according to claim 9, wherein the at least one instruction is executed by the processor in order to:

receive a request for advertisement from the client;
request the second AD information to an outside server;
acquire the second AD information from the outside server; and
transmit the second AD information to the client.

11. An operating method of a client to provide an advertisement, comprising:

transmitting a Hypertext Transfer Protocol HTTP) request to a server;

acquiring HTTP response as a response information to the HTTP request, which includes first AD information, from the server, the HTTP response transferred from a web server; and outputting the HTTP response, wherein the HTTP response information is HTTP response information amended by the server, in which at least a partial field including the first AD information is obfuscated by adding dummy tag, and the dummy tag including a plurality of hierarchical tags and attribute values, wherein at least a partial field of the HTTP response includes a plurality of hierarchical tags and attribute values which are randomly assigned for every single HTTP request, and wherein the plurality of hierarchical tags and attribute values are hierarchical tags and attribute values independent of an operation to output the first AD information.

12. The method according to claim 11, wherein, if information on at least a partial field of the amended HTTP response information is blocked, the amended HTTP response information further includes a repair script to utilize the blocked partial field.

13. The method according to claim 12, wherein the repair script is executed to determine whether the first AD information was blocked or not.

14. The method according to claim 13, further comprising:

transmitting information for requesting an advertisement to the server if the first AD information is blocked;
acquiring second AD information from the server; and
outputting the second AD information.

* * * * *